(12) United States Patent
Dang et al.

(10) Patent No.: US 7,035,209 B2
(45) Date of Patent: Apr. 25, 2006

(54) CONTROL COMMUNICATIONS IN COMMUNICATIONS NETWORKS

(75) Inventors: Cuong Dang, Ottawa (CA); David Randall Heatley, Nepean (CA)

(73) Assignee: Tropic Networks Inc., Kanata (CA)

( * ) Notice: Subject to any disclaimer, the term of this patent is extended or adjusted under 35 U.S.C. 154(b) by 1044 days.

(21) Appl. No.: 09/934,851

(22) Filed: Aug. 23, 2001

(65) Prior Publication Data

US 2003/0039206 A1 Feb. 27, 2003

(51) Int. Cl.
*H04J 1/16* (2006.01)
(52) U.S. Cl. ...................... 370/228; 370/400
(58) Field of Classification Search ............... 370/216, 370/254, 238, 225–228, 395.21, 351, 400, 370/255
See application file for complete search history.

(56) References Cited

U.S. PATENT DOCUMENTS

| | | | | |
|---|---|---|---|---|
| 5,488,608 | A * | 1/1996 | Flammer, III | 370/400 |
| 6,456,599 | B1 * | 9/2002 | Elliott | 370/254 |
| 6,862,288 | B1 * | 3/2005 | Sharma et al. | 370/403 |
| 6,882,627 | B1 * | 4/2005 | Pieda et al. | 370/248 |

OTHER PUBLICATIONS

"The OSPF Opaque LSA Option", R. Coltun, RFC 2370, Jul. 1998, pp. 1 to 12.

* cited by examiner

*Primary Examiner*—Chi Pham
*Assistant Examiner*—Blanche Wong
(74) *Attorney, Agent, or Firm*—Victoria Donnelly

(57) ABSTRACT

A communications network has data and dedicated control network communication links between nodes. The control network is automatically and reliably created by each node determining each of its neighbor nodes to which it has a direct data link, each node having at least two neighbor nodes, and establishing a control network link for communicating control network traffic directly with each of these neighbor nodes. Each control network link can, if a dedicated control network link is not available, use bandwidth of a data link between the respective nodes, a link selection protocol being based on shared risk link groups and available bandwidth.

18 Claims, 3 Drawing Sheets

CONTROL COMMUNICATIONS IN COMMUNICATIONS NETWORKS

This invention relates to communications networks, and is particularly concerned with providing a control network for reliably communicating control traffic among nodes in a communications network.

Although the invention is described below in the context of an optical communications network, the term "communications network" is used herein to embrace any network of nodes among which communications can take place via communications links of any form. As used herein, the term "data" refers to user traffic which it is a purpose of the communications network to carry; data or user traffic is carried in the communications network via communications paths or links which are referred to as data or in-band links. In contrast, the term "control" is used herein to refer to other, non-user, traffic in the communications network which may be provided for control, administration, network management, or other purposes; control traffic may be carried using available bandwidth of in-band links and/or on other communications paths or links which do not carry data or user traffic, and are referred to as control or out-of-band links.

BACKGROUND

It is known to provide a communications network, comprising nodes and communications links between the nodes, in which redundancy is provided for maintaining at least some communications among the nodes in the event of failures in the network. For example, in the case of an optical communications network in which optical fibers, which may carry WDM (wavelength division multiplexed) optical signals, provide communications links among optical nodes of the network, protection switching of communications against a failure in the network, for example due to a fiber cut or a node failure, can be provided by re-routing the optical signals via different fibers provided redundantly for this purpose.

Whether or not such a communications network includes such protection switching for its data or user traffic, it must also be set up and arranged to carry necessary non-user or control traffic, for example for administration and network management purposes. To this end, it is known for a network operator to engineer and manually configure or provision the communications network to provide for the necessary control traffic communications. As indicated above, the control traffic can use bandwidth of the same communication links as are used by the data or user traffic, and/or dedicated control traffic paths which are not used for data. The control traffic paths can be considered as a control network which is overlaid on the data or user traffic paths and constitutes a subset of the communications network.

Manual provisioning of the control network takes time and is prone to errors, and these factors become increasingly significant with increasing complexity of the communications network. In addition, in the event of a fault in the communications network, the control traffic of such a manually provisioned control network may not be protected by any protection switching or redundancy that is provided.

Consequently, a need exists for an improved method of providing control communications in communications networks, and consequently improved communications networks.

SUMMARY OF THE INVENTION

According to one aspect of this invention there is provided a method of automatically creating a control network comprising communication links for communicating control network traffic between nodes of a communications network, comprising the steps of, in each of a plurality of nodes:

establishing a list of a plurality of neighbour nodes to each of which the node has a direct communication link for communicating user traffic with the neighbour nodes; and establishing a control network link for communicating control network traffic directly with each of said neighbour nodes in said list.

Another aspect of this invention provides, in a communications network comprising a plurality of nodes, first communication links for communicating user traffic between nodes, each node having at least one of said first communication links with each of a plurality of respective neighbour nodes, and second communication links for communicating control network traffic between at least some of the nodes, a method of automatically creating a control network comprising the steps of, in each node: determining each of said plurality of respective neighbour nodes; and establishing, using one of said second communication links or bandwidth of one of said first communication links, a control network link for communicating control network traffic directly with each of said respective neighbour nodes.

Preferably the step of establishing a control network link for communicating control network traffic directly with each of said respective neighbour nodes comprises, in the event of a fault adversely affecting a control network link using one of said second communication links, maintaining the control network link using available bandwidth of one of said first communication links. This ensures, to the extent permitted by the communications network and the fault, that the control network is self-healing in the presence of the fault.

The invention also provides a communications network comprising a plurality of nodes, first communication links for communicating user traffic between nodes, each node having at least one of said first communication links with each of a plurality of respective neighbour nodes, and second communication links for communicating control network traffic between at least some of the nodes, wherein each of the nodes is arranged for carrying out this method.

The invention further provides a communications network comprising a plurality of nodes and a plurality of communication links for communicating user traffic and control network traffic between the nodes, wherein each of the nodes is arranged for determining a plurality of neighbour nodes to each of which the node has a direct communication link for communicating user traffic, and is further arranged for automatically establishing and maintaining a control network link for communicating control network traffic directly with each of said neighbour nodes.

BRIEF DESCRIPTION OF THE DRAWINGS

The invention will be further understood from the following description by way of example with reference to the accompanying drawings, in which.

DETAILED DESCRIPTION

Figure 1:
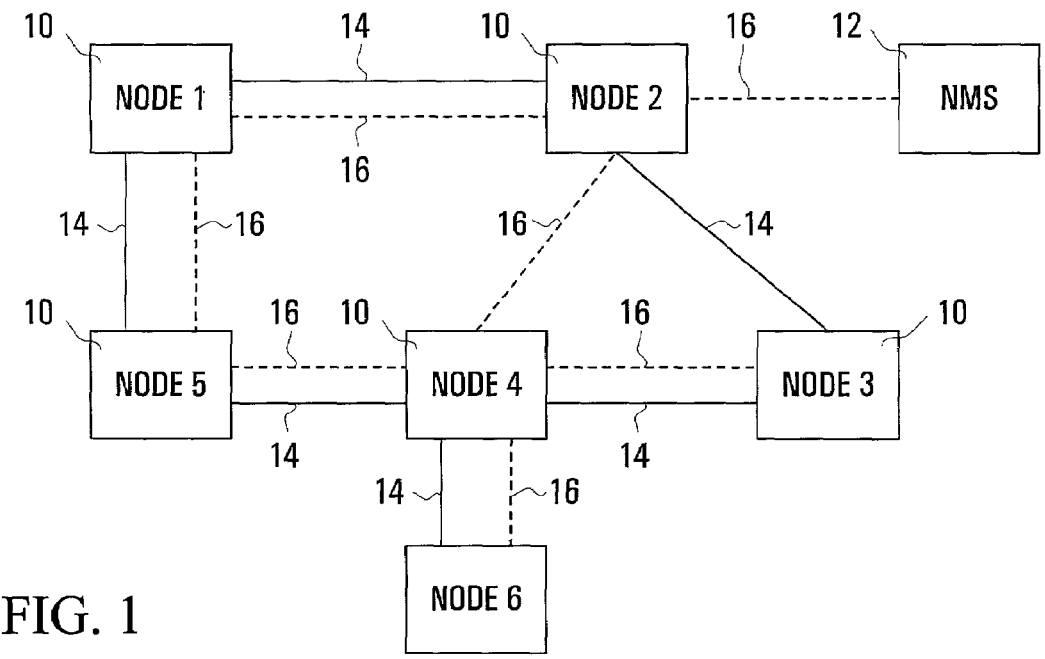
FIG. 1 illustrates a simple optical communications network incorporating an embodiment of the invention.

Referring to FIG. 1, a simple optical communications network is illustrated as comprising a plurality of, in this example six, nodes 10, identified individually as Node 1 to Node 6, and a network management station (NMS) 12, which are coupled together via optical communications paths or links represented by solid and dashed lines.

As is known in the art, such a communications network can include an arbitrary number of nodes 10 and network management stations 12, which may be located together or separately from one another, with various arrangements of communications links among the nodes 10 and NMSs 12 having any desired configuration or topology. Furthermore, such a communications network can be coupled to other similar or different communications networks in various manners. Accordingly, FIG. 1 serves merely to illustrate a simple form of network for the purposes of describing an embodiment of the invention.

The optical communications paths or links represented by solid and dashed lines in FIG. 1 comprise data or in-band links 14, represented by solid lines and serving primarily for carrying data or user traffic, and control or out-of-band links 16, represented by dashed lines and serving for carrying control traffic as explained above. The data links 14 and control links 16 are subsets of the overall set of communications links of the communications network.

Conveniently, and to a large extent as shown in FIG. 1, the data or in-band links 14 and the control or out-of-band links 16 parallel one another to provide respective separate communications links for data and control traffic. For example, in FIG. 1 Node 1 has separate parallel data and control links 14 and 16 respectively to Node 2, and separate parallel data and control links 14 and 16 respectively to Node 5. Each node to which a node has a direct data or in-band path is referred to as an adjacent node or a neighbour node; for example Node 2 and Node 5 are adjacent or neighbour nodes for Node 1.

However, such a predominant parallel arrangement of separate data and control links 14 and 16 is not essential. For example, FIG. 1 illustrates a control link 16 between Node 2 and Node 4 without any parallel data link. Furthermore, FIG. 1 illustrates a data link 14 between Node 2 and Node 3 without any separate control link between these nodes. In the latter case, in accordance with this embodiment of the invention and as further described below, a portion of the communications bandwidth on the data link 14 between Node 2 and Node 3 is used for control traffic.

Similarly, a portion of the communications bandwidth on any of the data or in-band links 14 between adjacent nodes 10 can be used for control traffic in accordance with this embodiment of the invention as further described below. For example, such a situation may arise in the event that the bandwidth of a control link 16 is insufficient for the control traffic to be carried by the link, for example in the event of a fault on the control link 16.

In accordance with embodiments of this invention, a requirement for manual provisioning of the control network, and an associated risk of errors in such manual provisioning, is avoided by implementing in each node 10 a control network automatic creation (CNAC) process which (unless disabled as described below) is activated when the node is powered up and remains in effect while the node is active or in operation.

This CNAC process allows the nodes 10 of the network to automatically create and maintain the control network with a topology, or subset of control traffic links, that provides for the control traffic and for redundancy so that, to a reasonable degree, the control network can be maintained despite failures in the communications network. Thus the control network is automatically created and maintained with a desirable level of reliability. If, for example as in the case of Node 6 in FIG. 1 as described below, the CNAC process can not be satisfied for a particular node, an alarm can be provided to alert a network operator to this situation.

In accordance with this CNAC process, each node is required to have at least one control network link (i.e. path of the control network for control traffic) to each of its adjacent or neighbour nodes, and to have at least two adjacent or neighbour nodes.

The CNAC process is desirably also implemented using a particular link selection protocol, as described below.

Figure 2:
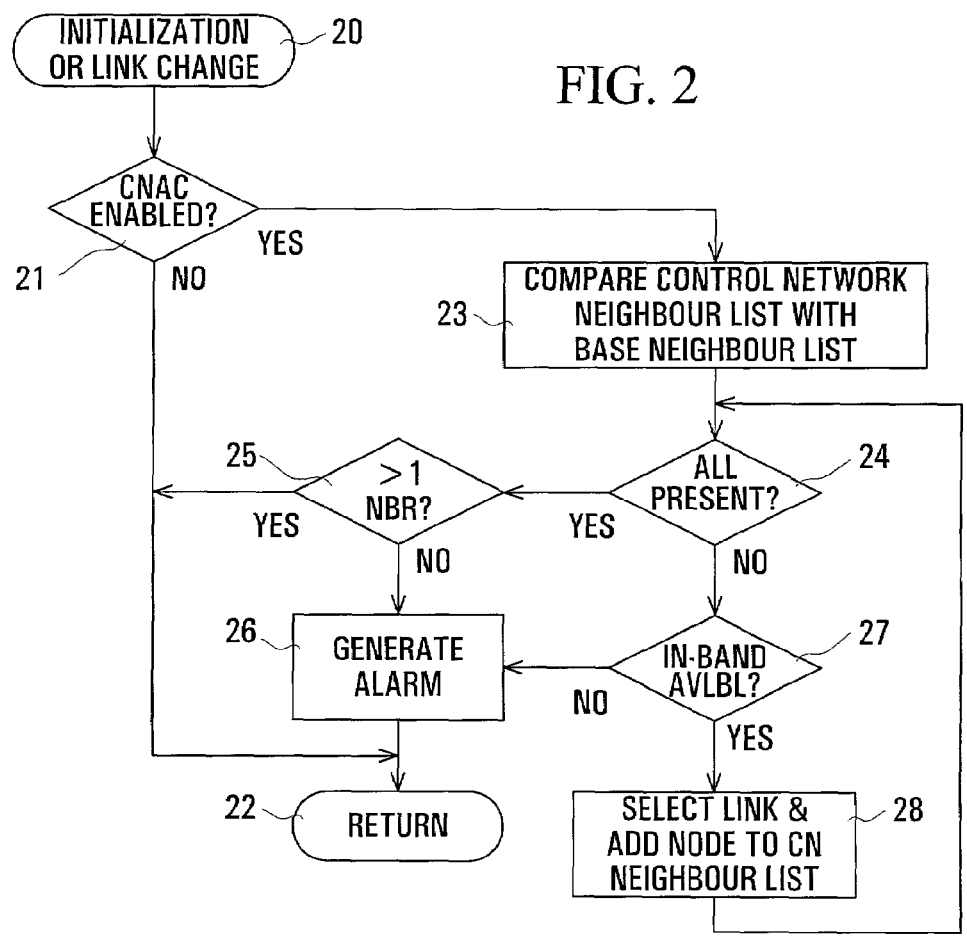
FIG. 2 is a flow chart indicating steps which can be performed by a node of the network of FIG. 1 in carrying out an embodiment of the invention.

FIG. 2 illustrates steps of the CNAC process in the form of a flow chart, steps of which are followed individually by each node 10 of the network. On power up and consequent initialization of a node, and while the node is active in the event of a change (e.g. addition, removal, or deletion of a link due to a failure) of communication links, the CNAC process is entered at a block 20 in FIG. 2.

As a part of this process block 20, the respective node 10 establishes in known manner a list of its adjacent or neighbour nodes, to each of which it has a direct data or in-band link 14. As the data or in-band links 14 represent a base topology of the communications network, this list in each node is referred to as a base neighbour list. In a similar manner, the respective node 10 establishes a list of its adjacent or neighbour nodes to which it also has a direct connection via a control link 16. This list is referred to as a control network (CN) neighbour (NBR) list.

With respect to the establishment of the base neighbour and control network neighbour lists, and generally with respect to the operation of the communications network, it is noted that the network can operate in accordance with known operating procedures and protocols, including for example the so-called OSPF (open shortest path first) link-state routing protocol in accordance with IETF (Internet Engineering Task Force) document RFC2328. Such procedures and protocols also provide so-called LSAs (link state advertisements), which can be extended to so-called opaque LSAs as documented in IETF document RFC2370. Opaque LSAs, which can be used by embodiments of this invention as described below, provide for example for communication of propriety messages (i.e. messages not understood by the OSPF protocol) between nodes of the communications network.

At a subsequent block 21 in FIG. 2, the respective node 10 determines whether the CNAC process is enabled for this node, and if not (i.e. if the CNAC process is disabled for this node) proceeds to a return block 22 without further action. This enables the automatic creation of the control network to be disabled for one or more individual nodes, in which case manual provisioning of the control network can be carried out for such nodes in known manner.

If the CNAC process is enabled for this node as determined at the block 22 in FIG. 2, then as indicated at a block 23 the node compares its control network neighbour list with its base neighbour list. In a subsequent decision block 24 the node 10 determines whether all of the adjacent nodes in the base neighbour list are also present in the control network neighbour list, i.e. whether the control network neighbour list completely contains the base neighbour list.

Referring again for example to FIG. 1, it can be appreciated that this will be the case for Node 1, because this node has a respective control network link 16 to each of its adjacent or neighbour nodes, namely Node 2 and Node 5. Thus Node 1 will have a base neighbour list identifying Node 2 and Node 5, and a control network neighbour list also identifying Node 2 and Node 5.

Similarly, this will be the case for Node 5, which will have a base neighbour list identifying Node 1 and Node 4, and a control network neighbour list also identifying Node 1 and Node 4, and also for Node 6, which will have a base neighbour list and a control network neighbour list each identifying only Node 4. Further, this will also be the case for Node 4, which as can be seen from FIG. 1 will have a base neighbour list identifying its adjacent or neighbour nodes, namely Node 3, Node 5, and Node 6, and a control network neighbour list identifying these same nodes (i.e. the base neighbour list is completely contained within the control network neighbour list) and also identifying Node 2 to which Node 4 has a further control network or out-of-band link 16.

Conversely, this will not be the case for Node 2 and Node 3 as shown in FIG. 1. For Node 2, the base neighbour list will identify Node 1 and Node 3 to which there are direct data links 14, whereas the control network neighbour list will identify Node 1 and Node 4 to which there are dedicated control network links 16; consequently, Node 3 in the base neighbour list is not also identified in the control network neighbour list. For Node 3, the base neighbour list will identify Node 2 and Node 4 to which there are direct data links 14, whereas the control network neighbour list will identify only Node 4 to which there is a dedicated control network link 16; consequently, Node 2 in the base neighbour list is not also identified in the control network neighbour list.

Referring again to FIG. 2, if it is determined in the decision block 24 that all of the nodes identified in the base neighbour list are also present in the control network neighbour list, then at a decision block 25 the node determines whether there are at least two (i.e. more than one) such neighbour nodes in the base neighbour list. If so, the control network is determined for the respective node, and the return block 22 is reached. In the example of FIG. 1, this would be the case for Node 1, Node 4, and Node 5.

If there are not at least two such neighbour nodes in the base neighbour list, then at a block 26 an alarm is generated and then the return block 22 is reached. In the example of FIG. 1, this would be the case for Node 6, which has only one neighbour node. The alarm serves to indicate to a network operator that the CNAC process has not met its requirements as described above, and this alarm can be investigated in known manner.

Conversely, if it is determined in the decision block 24 that at least one node identified in the base neighbour list is not present in the control network neighbour list, then in a decision block 27 the node determines, for example as further described below, whether there is at least one available in-band, i.e. data or user traffic, link 14 to this node with sufficient bandwidth to be used as a control network link. If not, then the block 26 is again reached to generate an alarm indicating a failure of the automatic process to create the control network in accordance with its requirements, and again a return is made via the block 22.

If, however, there is at least one available in-band link with sufficient bandwidth, then a block 28 is reached in which an in-band or data link is selected (in a manner for example as described below) to provide the desired control network link, the respective node identified in the base neighbour list is consequently added to the control network neighbour list, and a loop is made back to the decision block 24. The CNAC process of FIG. 2 thus continues until the control network is automatically created, in accordance with its requirements as described above, for this node, or the automatic creation process fails to meet the requirements and an alarm is generated accordingly.

As stated above, the CNAC process is activated when each node is powered up and remains in effect while the node is active or in operation. In the latter respect, in the event of a fault in the communications network adversely affecting a control network link using, for example, one of the links 16, the resulting link change detected in a node 10 results in the node repeating the CNAC process from the block 20 in the flow chart of FIG. 2, thereby maintaining the control network link using available bandwidth of one of the links 14 to the extent that this is possible within limits imposed by the topology of the communications network and the nature of the fault. Thus the control network can be automatically self-healing within such limits.

It can be appreciated that the CNAC process as described above takes place individually in each node 10. In the case of the network of FIG. 1, which illustrates only one in-band or data link 14 between Node 2 and Node 3 having no dedicated control network link directly between them, Node 2 and Node 3 would each separately determine at the block 27 whether this link has the necessary available bandwidth for the control network link; if so, select this link accordingly; and, if not, generate an alarm as described above.

More generally, however, there may be a plurality of in-band or data links between two nodes between which it is desired to automatically create a control network link as described above, and it is desirable to provide a link selection protocol to facilitate an optimum selection of the same link by the two nodes.

In an embodiment of this invention, such a link selection protocol is based on two attributes which are associated with each of the links, these two attributes being an available bandwidth (ABW) and a shared risk link group (SRLG). The ABW is the bandwidth on the respective link that is available for reservation, and hence which can (if the bandwidth is sufficient) potentially be reserved to provide a control network link. The SRLG is an identifier which indicates for each link a shared risk with one or more other links which may be used for the control network. This is explained further below with reference to FIG. 3.

Figure 3:
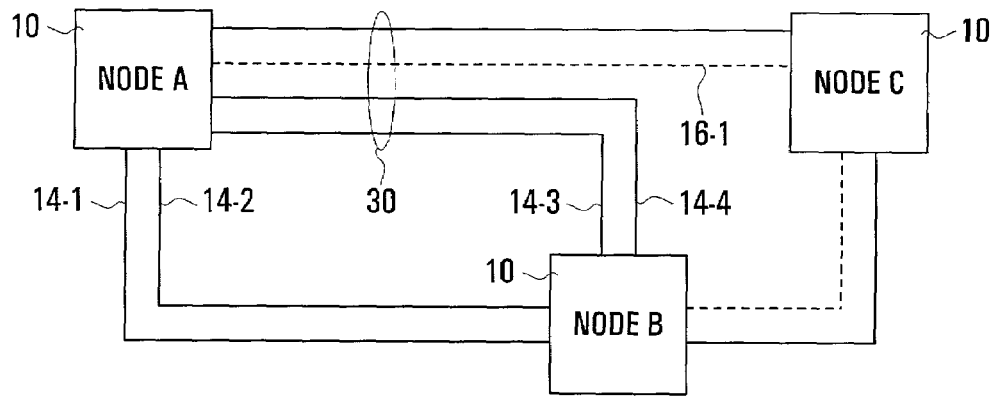
FIG. 3 illustrates a communications network arrangement for use in describing a shared risk link group.

FIG. 3 illustrates a simple communications network arrangement in which there are three nodes 10, identified as Nodes A, B, and C, with in-band or data links between them illustrated by solid lines as in FIG. 1, and dedicated control network or out-of-band links between them represented by dashed lines also as in FIG. 1. As illustrated in FIG. 3, there are four in-band or data links 14-1 to 14-4 between Node A and Node B, but there is no dedicated control network or out-of-band link between these nodes. Conversely, Node C has both an in-band or data link and a dedicated control network link to each of Nodes A and B.

From the description of the CNAC process described above, it can be appreciated that this CNAC process, applied to the arrangement of FIG. 3, will cause each of Nodes A and B to try to select one of the in-band links 14-1 to 14-4 and to reserve available bandwidth on the selected link for use as a control network link between these nodes, in order to meet the requirements of the CNAC process.

Each of the links 14-1 to 14-4 has attributes including an ABW and a SRLG as discussed above. For the purposes of explanation, it is assumed for example that the available bandwidth on the links 14-1 to 14-4 progressively decreases in this order of these links, as represented by the respective ABWs of these links. Further, it is assumed that the ABW of the link 14-4 is not sufficient for the control network link desired between Nodes A and B, so that this link is not suitable for selection for this purpose and is excluded at the decision block 27 in FIG. 2.

In addition, as illustrated by an ellipse 30 in FIG. 3, it is assumed that the links 14-3 and 14-4 have a shared risk with the control network link 16-1 (and also with the in-band link) between Nodes A and C. For example, such a shared risk may arise from these links being on different fibers in the same conduit. Consequently, the links 14-3, 14-4, and 16-1 have a common SRLG identifier to denote this shared risk.

It can be appreciated that, if either of the in-band links 14-3 or 14-4 were to be used to provide the control network link between Nodes A and B to meet the requirements of the CNAC process, then a single fault such as a cut of the conduit including these links could isolate Node A from the rest of the control network. For this reason, the link 14-3 is excluded, and the link 14-4 is also excluded, from selection by each of Nodes A and B for providing the required control network link between these nodes. This exclusion is based on these in-band links having a common SRLG identifier with another control network link, in this case the link 16-1, in the network.

Accordingly, each of Nodes A and B selects one of the in-band links 14-1 and 14-2 to provide the required control network link. For load balancing purposes, this selection is arranged to choose the in-band link having the greatest ABW, in this example the link 14-1 as indicated above.

Figure 4:
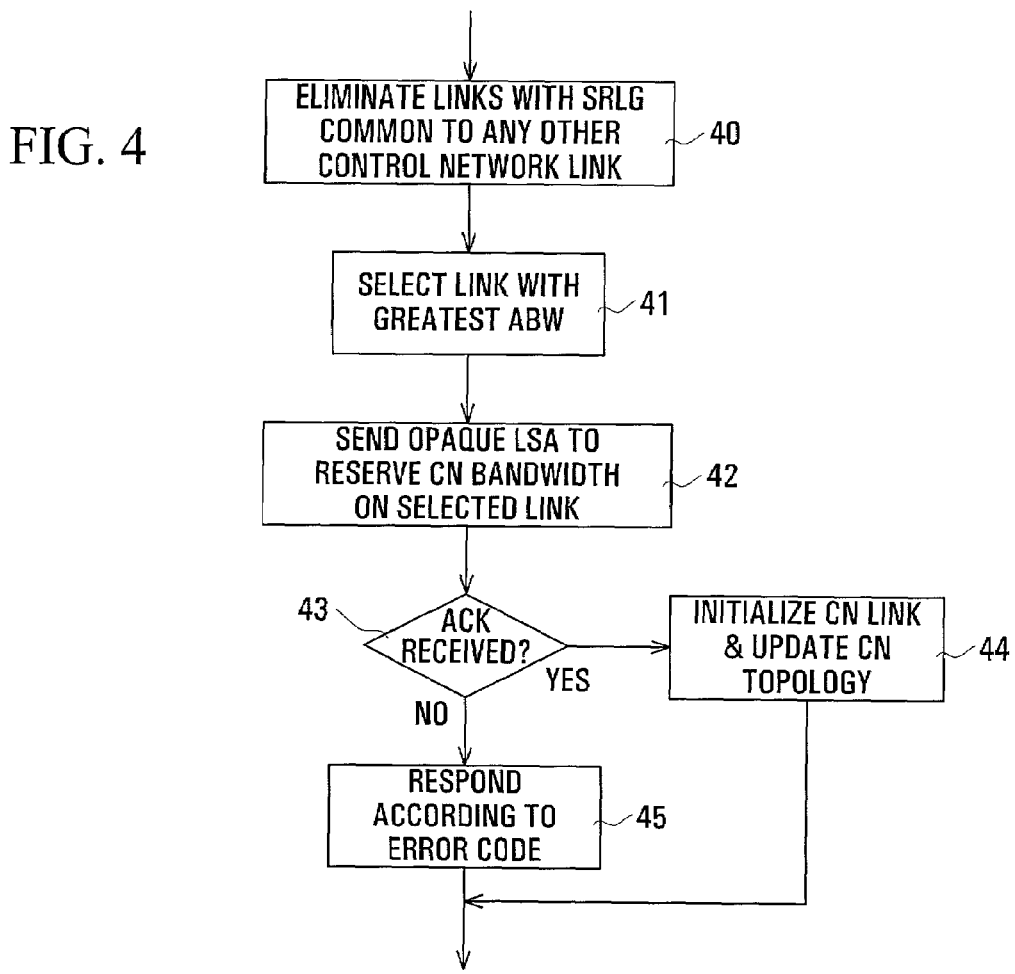
FIG. 4 is a flow chart illustrating a link selection protocol.

FIG. 4 is a flow chart illustrating the link selection protocol, corresponding to the block 28 in the flow chart of FIG. 2 and reached after determining, at the block 27 in FIG. 2, that there is at least one in-band link with sufficient available bandwidth to be used for the desired control network link.

For clarity in the following description with reference to FIG. 4, the node in which the steps of FIG. 4 are taking place is referred to as the source node, and the node to which the respective in-band links extend from the source node is referred to as the neighbour node. It can be appreciated that, as each node operates independently, similar steps can take place with these nodes interchanged.

Referring to FIG. 4, in a block 40 any links having a SRLG identifier which is common to any other control network link is eliminated as described above; although not shown in FIG. 4, if this eliminates all potential in-band links then the CNAC process fails and an alarm is generated in the same manner as described above. In a subsequent block 41, the source node selects the in-band link to the neighbour node having the greatest available bandwidth. Thus the blocks 40 and 41 represent the selection of the link on the basis of the two attributes discussed above.

As represented by a block 42, the source node then sends an opaque LSA, as discussed above, to the neighbour node, specifying the amount of bandwidth that should be reserved for carrying control network traffic on the selected in-band link. If the neighbour node agrees to the requested bandwidth and is not currently negotiating use of a different link with the source node, then it responds with an ACK (positive acknowledgement) opaque LSA. The source node determines this at a block 43, and accordingly reaches a block 44 in which it initializes the control network link using the reserved bandwidth on the selected in-band link, and updates the control network topology (i.e. its control network neighbour list) accordingly, thereby completing the link selection process.

If the neighbour node does not agree to the requested bandwidth or (acting itself as the source node) is currently negotiating use of a different link with the source node (acting as the neighbour node), then it can instead respond with a NACK (negative acknowledgement) opaque LSA including a corresponding error code, with the source node consequently reaching a block 45 in which it responds in accordance with the error code.

For example, the neighbour node may indicate that the requested bandwidth on the selected in-band link is not available, in which case the source node can mark this link as not available for carrying control network traffic. Alternatively, the neighbour node may, if it has a higher IP (Internet Protocol) address than the source node, choose a different in-band link for use as the control network link, indicating this as part of the opaque LSA data. In this case the source node attempts to reserve the necessary bandwidth for the control network link on the specified in-band link. The condition of a higher IP address in this case serves to resolve possible contention between the source and neighbour nodes.

Figure 5:
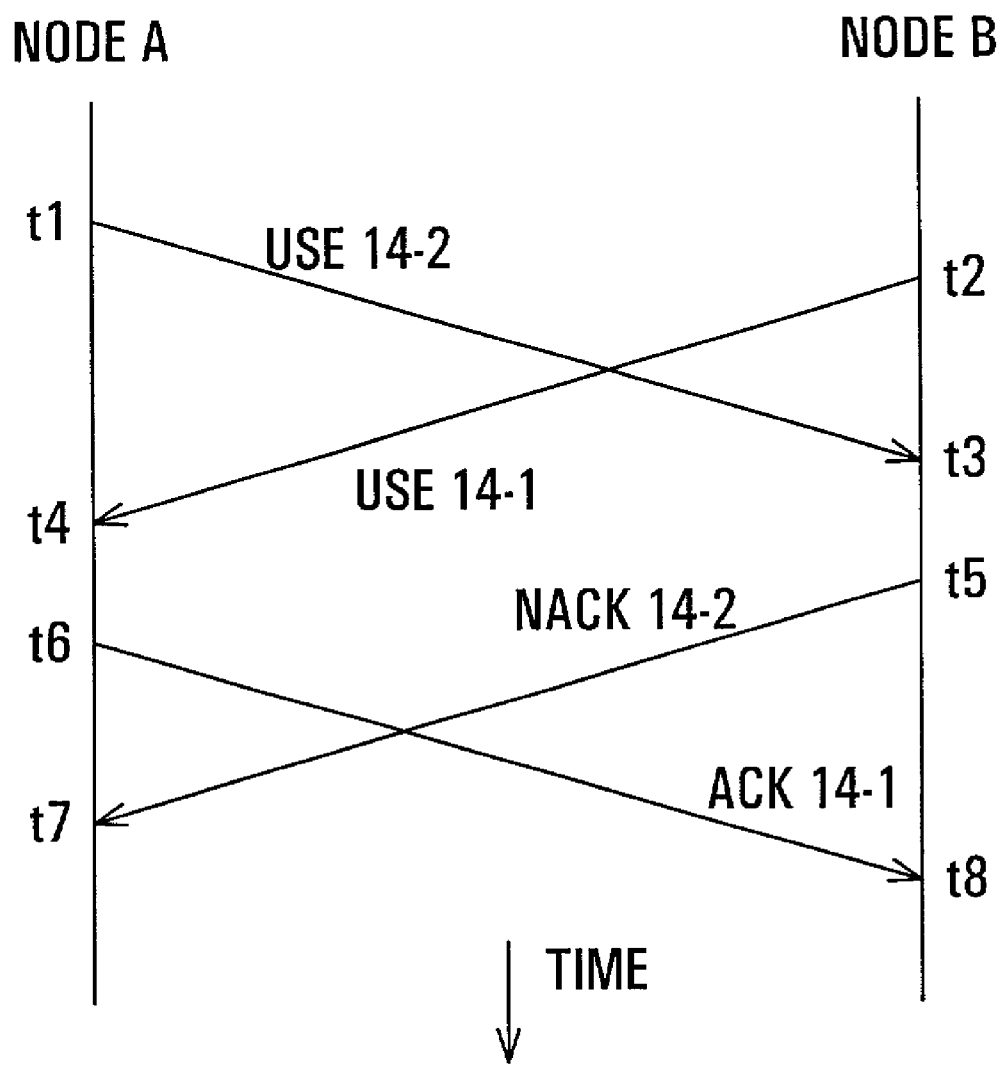
FIG. 5 is a messaging diagram relating to the link selection protocol.

This aspect of the link selection protocol is explained further with reference to the messaging diagram of FIG. 5, in which t1 to t8 represent times at which opaque LSA messages are sent and received by the Nodes A and B of FIG. 3 for selection of one of the links 14-1 and 14-2 between these nodes. In FIG. 5, vertical lines represent Nodes A and B, inclined arrowed lines represent messages and their directions, time advances downwardly as indicated, and it is assumed that Node B has a higher IP address than Node A. The situation represented by FIG. 5 could for example occur in the situation described above in relation to FIG. 3 if the links 14-1 and 14-2 have the same available bandwidth.

In FIG. 5, at the time t1 Node A, acting as the source node, sends an opaque LSA message to use the link 14-2 as the control network link with Node B, and this is received by Node B at the time t3. At the time t2 (which is illustrated as being between the times t1 and t3, but could alternatively be before the time t1 or after the time t3) Node B, acting as the source node, sends an opaque LSA message to use the link 14-1 as the control network link with Node A, and this is received by Node A at the time t4. On the basis of its higher IP address, in response to the message it receives to use the link 14-2 Node B sends a NACK at the time t5, and this is received by Node A at the time t7. Conversely, on the basis of its relatively lower IP address, in response to the message it receives to use the link 14-1 Node A sends an ACK at the time t6, and this is received by Node B at the time t8. Thus after the times t7 and t8 both Nodes A and B have agreed to use the link 14-1 as the control network link between them.

It can be appreciated from the above description that the CNAC process serves automatically to create the control network with a control network link to each of its adjacent or neighbour nodes, of which there must be at least two to meet the CNAC process requirements described above, so that there is an inherent reliability of the resulting control network. Furthermore, in the event of a fault in the communications network the CNAC process continues to be active in each node to maintain and, if necessary, replace disrupted control network links using available bandwidth of in-band or data links, so that reliability of the control network continues to be maintained.

Although particular embodiments of the invention are described above, it can be appreciated that numerous modifications, variations, and adaptations may be made without departing from the scope of the invention as defined in the claims.

The invention claimed is:

1. A method of automatically creating a control network comprising communication links for communicating control network traffic between nodes of a communications network, comprising the steps of, in each of a plurality of nodes:

establishing a list of a plurality of neighbour nodes to each of which the node has a direct communication link for communicating user traffic with the neighbour nodes; and establishing a control network link for communicating control network traffic directly with each of said neighbour nodes in said list; wherein the communication links comprise first links for communicating user traffic between nodes and second links for communicating control network traffic between nodes, and the step of establishing a control network link for communicating control network traffic directly with each of said neighbour nodes in said list comprises establishing the control network link using one of said second links where this is available between the respective nodes, and otherwise establishing the control network link using available bandwidth of one of said first links between the respective nodes.

2. A method as claimed in claim 1 wherein the step of establishing the control network link using available bandwidth of one of said first links between the respective nodes comprises selecting one of a plurality of said first links between the respective nodes having a greatest available bandwidth.

3. A method as claimed in claim 1 wherein each of said communication links has an identification of shared risk with others of said communication links, and the step of establishing the control network link using available bandwidth of one of said first links between the respective nodes comprises excluding any of said first links having a shared risk with any other control network link.

4. A method as claimed in claim 3 wherein the step of establishing the control network link using available bandwidth of one of said first links between the respective nodes comprises selecting one of a plurality of said first links between the respective nodes having a greatest available bandwidth.

5. A method as claimed in claim 1 wherein the step of establishing a control network link for communicating control network traffic directly with each of said neighbour nodes in said list comprises, in the event of a fault adversely affecting a control network link using one of said second links, maintaining the control network link using available bandwidth of one of said first links between the respective nodes.

6. In a communications network comprising a plurality of nodes, first communication links for communicating user traffic between nodes, each node having at least one of said first communication links with each of a plurality of respective neighbour nodes, and second communication links for communicating control network traffic between at least some of the nodes, a method of automatically creating a control network comprising the steps of, in each node:

determining each of said plurality of respective neighbour nodes; and establishing a control network link for communicating control network traffic directly with each of said respective neighbour nodes by using one of said second communication links where this is available between the respective nodes, and otherwise establishing the control network link by using available bandwidth of one of said first communication links between the respective nodes.

7. A method as claimed in claim 6 wherein the step of establishing the control network link using bandwidth of one of said first communication links comprises selecting one of a plurality of said first communication links between the respective nodes having a greatest available bandwidth.

8. A communications network comprising a plurality of nodes, first communication links for communicating user traffic between nodes, each node having at least one of said first communication links with each of a plurality of respective neighbour nodes, and second communication links for communicating control network traffic between at least some of the nodes, wherein each of the nodes is arranged for carrying out the method of claim 7.

9. A method as claimed in claim 6 wherein each of said communication links has an identification of shared risk with others of said communication links, and the step of establishing the control network link using bandwidth of one of said first communication links comprises excluding any of said first communication links having a shared risk with any other control network link.

10. A method as claimed in claim 9 wherein the step of establishing the control network link using bandwidth of one of said first communication links comprises selecting one of a plurality of said first communication links between the respective nodes having a greatest available bandwidth.

11. A communications network comprising a plurality of nodes, first communication links for communicating user traffic between nodes, each node having at least one of said first communication links with each of a plurality of respective neighbour nodes, and second communication links for communicating control network traffic between at least some of the nodes, wherein each of the nodes is arranged for carrying out the method of claim 9.

12. A method as claimed in claim 6 wherein the step of establishing a control network link for communicating control network traffic directly with each of said respective neighbour nodes comprises, in the event of a fault adversely affecting a control network link using one of said second communication links, maintaining the control network link using available bandwidth of one of said first communication links between the respective nodes.

13. A communications network comprising a plurality of nodes, first communication links for communicating user traffic between nodes, each node having at least one of said first communication links with each of a plurality of respective neighbour nodes, and second communication links for communicating control network traffic between at least some of the nodes, wherein each of the nodes is arranged for carrying out the method of claim 12.

14. A communications network comprising a plurality of nodes, first communication links for communicating user traffic between nodes, each node having at least one of said first communication links with each of a plurality of respective neighbour nodes, and second communication links for communicating control network traffic between at least some of the nodes, wherein each of the nodes is arranged for carrying out the method of claim 6.

15. A communications network comprising a plurality of nodes and a plurality of communication links for communicating user traffic and control network traffic between the nodes, wherein each of the nodes is arranged for determining a plurality of neighbour nodes to each of which the node has a direct communication link for communicating user traffic, and is further arranged for automatically establishing and maintaining a control network link for communicating control network traffic directly with each of said neighbour nodes, wherein the communication links comprise first links for communicating user traffic between nodes and second links for communicating control network traffic between nodes, and each node is arranged for automatically establishing the control network link using one of said second links where this is available between the respective nodes, and otherwise establishing the control network link using available bandwidth of one of said first links between the respective nodes.

16. A communications network as claimed in claim 15 wherein each node is arranged, for establishing the control network link using available bandwidth of one of said first links between the respective nodes, to select one of a plurality of said first links between the respective nodes having a greatest available bandwidth.

17. A communications network as claimed in claim 15 wherein each of said communication links has an identification of shared risk with others of said communication links, and each node is arranged, for establishing the control network link using available bandwidth of one of said first links between the respective nodes, to exclude any of said first links having a shared risk with any other control network link.

18. A communications network as claimed in claim 17 wherein each node is arranged, for establishing the control network link using available bandwidth of one of said first links between the respective nodes, to select one of a plurality of said first links between the respective nodes having a greatest available bandwidth.

\* \* \* \* \*